United States Patent [19]

Knuppertz et al.

[11] Patent Number: 4,581,873
[45] Date of Patent: Apr. 15, 1986

[54] DEVICE FOR FOLDING AND SEALING THE HEAD OF A FOLDED CARTON

[75] Inventors: Hans-Werner Knuppertz, Düsseldorf; Rudolf Stohanzl, Grevenbroich, both of Fed. Rep. of Germany

[73] Assignee: PKL Papier- und Kunststoff-Werke Linnich GmbH, Düsseldorf, Fed. Rep. of Germany

[21] Appl. No.: 622,934

[22] Filed: Jun. 21, 1984

[30] Foreign Application Priority Data

Jun. 22, 1983 [DE] Fed. Rep. of Germany ....... 3322402

[51] Int. Cl.⁴ ......................... B65B 7/16; B65B 51/22
[52] U.S. Cl. ................................... 53/373; 156/580.2; 156/583.1
[58] Field of Search ......................... 53/373, 379, 565; 156/73.1, 580.1, 580.2, 581, 583.1, 583.4

[56] References Cited

U.S. PATENT DOCUMENTS

| 2,955,643 | 10/1960 | Shapero et al. | 53/373 X |
| 3,212,413 | 10/1965 | Allen et al. | 53/373 X |
| 3,469,364 | 9/1969 | Bischoff | 53/373 X |
| 4,241,560 | 12/1980 | Deimel et al. | 53/373 |
| 4,306,400 | 12/1981 | Coleman et al. | 53/373 |

FOREIGN PATENT DOCUMENTS 2310260 12/1976 France ................................. 53/379

Primary Examiner—Robert L. Spruill
Assistant Examiner—Michael D. Folkerts
Attorney, Agent, or Firm—Sprung Horn Kramer & Woods

[57] ABSTRACT

The invention relates to a device for folding and sealing the head of a folded carton made out of a web or blank of cardboard coated on the inside with a thermoplastic layer. The device has levers or supports that carry the folding and pressure-welding tools and that are powered independently of each other by shafts. The result is a structure that is simple and easy to clean. It also allows satisfactory acceptance or introduction of force for the pressure-welding process. Since the force-introduction impact point and a point of contact between the tools that are to be approached to each other like tongs can be located on an axis of pressure, the shafts that pivot and power the lever and support need to accept no forces and accordingly remain free of stress.

12 Claims, 7 Drawing Figures

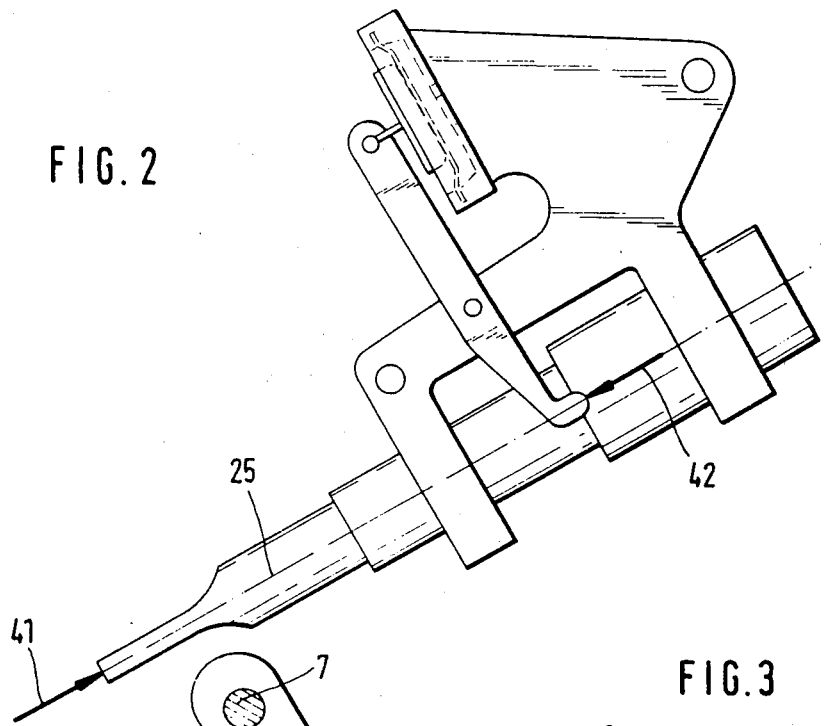
FIG. 2
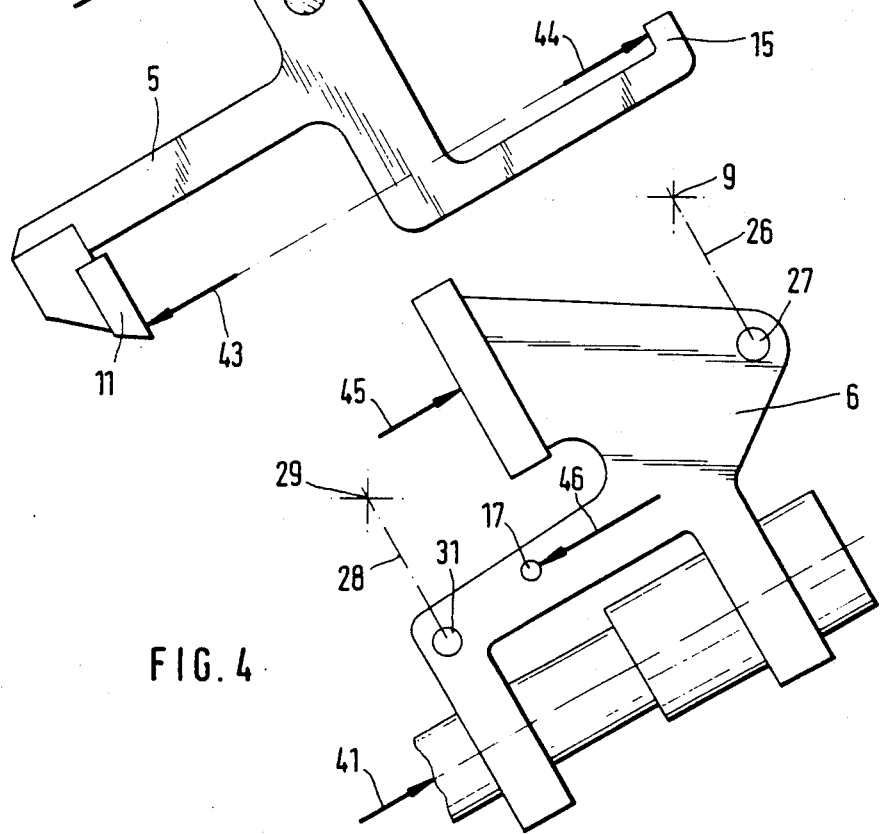
FIG. 3
FIG. 4

DEVICE FOR FOLDING AND SEALING THE HEAD OF A FOLDED CARTON

BACKGROUND OF THE INVENTION

The present invention relates to a device for folding and sealing the head of a folded carton made out of a web or blank of cardboard coated on the inside with a thermoplastic layer in a folding and pressure-welding station that has folding and pressure-welding tools consisting of a pair of jaws that can be brought together like tongs, one jaw mounted on a pivoting lever and the other mounted along with a welding element that operates in conjunction with the first jaw on a common support that is suspended in such a way that it can pivot.

A device of this kind is known, from U.S. Pat. No. 4,241,560 for example. This known device for folding and sealing the head of a folded carton has a common drive mechanism in the form of a pivoting radial cam that controls both the folding tools and the pressure-welding tools. The folding and pressure-welding motions and introduction of forces are transmitted by pressure-application rollers resting against the outer contour of the cam to the folding and pressure tools. The common drive mechanism for the folding and pressure-welding necessitates positioning the drive and control elements essentially above the folded cartons, which are advanced discontinuously on a conveyor belt. The mechanical drive and control elements above the folded cartons, which are opened or which are to be sealed, make it difficult to ensure that the inner surface of the still open cartons do not get contaminated with residual product because many points are necessarily difficult to access for cleaning. Furthermore, since the common drive mechanism for the folding and pressure tools makes it impossible to design the motions of the tools to be independent, the mutual position of the pressure tools will alter even when very slight wear occurs, on the force-transmission rollers for example, which has a detrimental effect on the quality of the welded seam. Futhermore, in the particular concept of the known device, both the shaft that bears the common cam and another shaft that bears the arms carrying the lever and support are very powerfully stressed while pressure is being applied, which is a particular drawback when several webs are involved.

SUMMARY OF THE INVENTION

The object of the present invention is to provide a device for folding and sealing the head of folded cartons that is distinguished by a design providing better access for cleaning and by improved or more practical acceptance of forces while pressure is being applied.

This object is attained in accordance with the invention in that the lever and the support can be powered independently of each other by means of shafts on which they are mounted in such a way as to pivot. The measures in accordance with the invention simplify the drive and control mechanism of the folding and pressure-welding tools in that no drive and control elements are located above the folded cartons while they are open or yet to be sealed, so that there is no longer any risk of contamination of the inner surface of the open folded carton. The independent drive for the folding tools and pressure-welding tools also allows them to be adjusted independently, improving the quality of the welded seam. Furthermore, the direct drive of lever and support through the separate shafts allows better acceptance of forces, especially when the shaft that drives the support, in conjunction with a lever that is mounted on the support in such a way that it can pivot and in conjunction with another lever that extends more or less parallel to the first and is articulated at a stationary point on the device, constitutes a parallel-crank mechanism that allows the support to describe, as is in itself known, an approximately rectilinear straight-line motion toward the jaw attached to the lever during the pressure-welding processes.

A special advantage of the present invention derives from a point of contact between the jaw on the lever and the other jaw on the support and a point of impact for introducing the force governing the pressure-welding processes, both points being positioned along the axis of pressure-welding force. This skillful introduction of pressure force prevents stress on the shaft that provides the pivoting mounting and drive for the lever that carries the first jaw.

A pressure cylinder is provided in a practical way to introduce force during the pressure-welding process.

Fastening the pressure cylinder to the support ensures that the forces that occur during the pressure process are not transmitted to the shaft that provides the pivoting mounting and drive for the support or to the other points of articulation in the parallel-crank mechanism.

Since no stress is accordingly exerted on the shafts that power the lever and supporting, the outer mechanisms, which are connected to the shafts and which power the tools during the pressure process, will also remain unstressed. This is a particular advantage when there are several webs and where several rows of packages are accordingly being folded and sealed in succession.

There are various ways of fastening the pressure cylinder to the support. Even the position is not especially important. When the pressure cylinder is mounted not concentric with the axis of pressure force on a leg of the support that faces away from the folding and pressure tools, it is practical to interpose a force-transmission mechanism between the pressure cylinder and the point of force-introduction impact on the axis of pressure-welding force.

The force-transmission mechanism can also be designed in any way desired and can be constructed in a wide variety of ways.

The force-transmission mechanism can be a double-armed lever mounted on the support in such a way that it can pivot around a pivot, with one arm connected by a tie rod to a piston-like or diaphragm-like setting element on the pressure cylinder and the other arm operating in conjunction with a component that provides a connection or contact with the lever that carries the first jaw.

The contact component can be a lug-like extension of the essentially Z-shaped lever.

The design can, however, also involve a roller interposed between the contact component and one arm of the pivoting lever, with the arm of the pivoting lever that operates in conjunction with it having a segment of a curve. The segment of the curve can be designed so that the pressure cylinder travels through only a short stroke as it moves and can be a short-stroke cylinder.

It is also possible for the component that connects the lever and the arm of the pivoting lever to be an articulated connecting lever.

Some preferred embodiments of the invention will now be described with reference to the accompanying drawings, wherein:

BRIEF DESCRIPTION OF THE DRAWINGS

FIGS. 2, 3 and 4 illustrate the principle of force introduction during the pressure process.

DETAILED DESCRIPTION OF THE PREFERRED EMBODIMENTS

Figure 1:
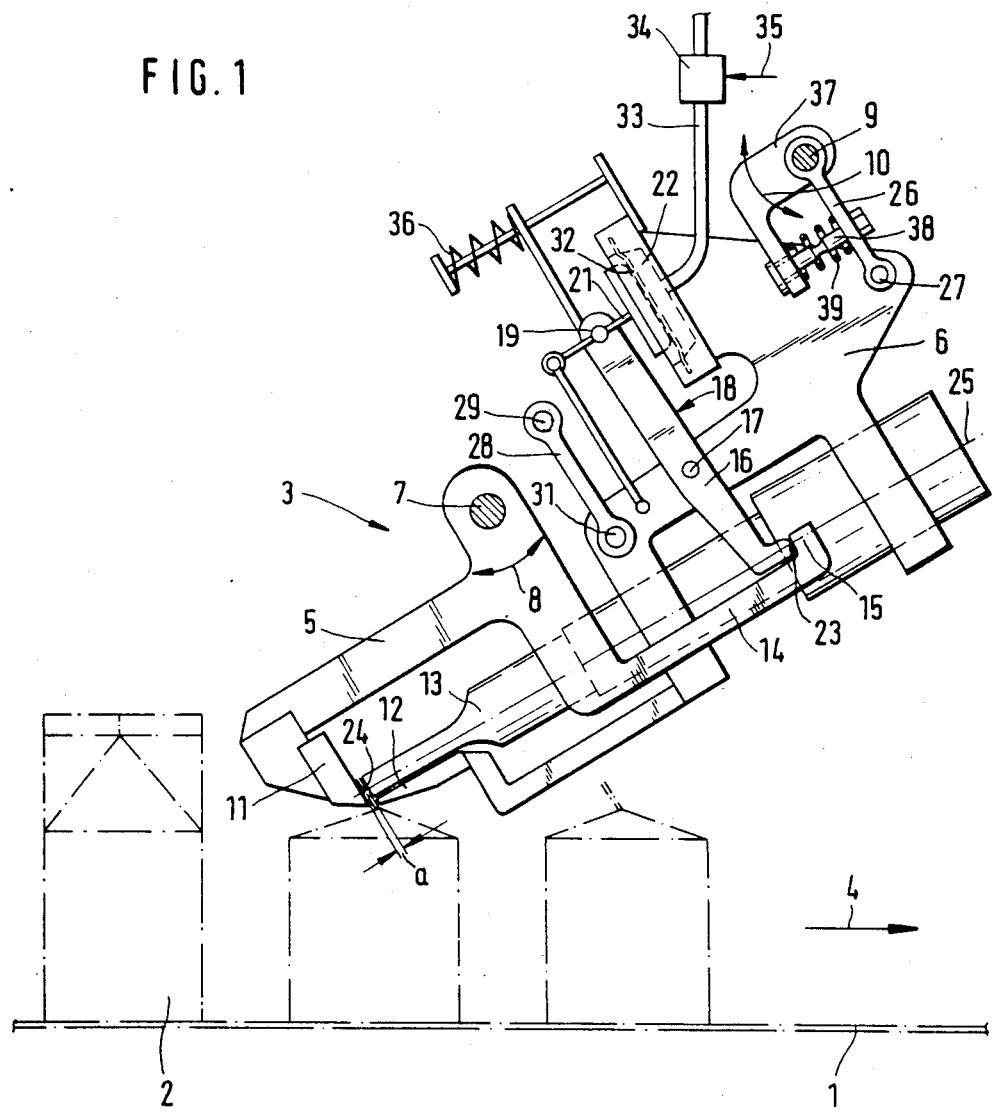
FIG. 1 is a schematic side view of a device for folding and sealing the head of a folded carton.

A series of previously manufactured folded cartons 2 filled with liquid but with their heads not yet sealed are advanced upright and with the ridge-seam area that is to be welded oriented transverse to the direction of transport on a conveyor belt 1 through a combination folding and pressure-welding station 3 in the direction indicated by arrow 4. They are advanced discontinuously. The presence of a folded carton 2 in the station can be detected by a sensor that activates the mechanisms in the station by means of controls.

The device for folding and sealing a folded carton 2 consists essentially of a lever 5 and a support 6. Lever 5 is mounted in such a way as to pivot around a shaft 7 that can drive it back and forth in the direction indicated by arrow 8, whereas support 6 can be driven by a shaft 9 in the direction indicated by arrow 10. Shafts 7 and 9 are connected to external drive mechanisms that are not illustrated. The forward, free, end of lever 5 supports a jaw 11. Another jaw 12 is mounted on the forward, free, end of support 6. More or less above jaw 12 is the forward end of a welding tool in the form of an ultrasound-wave oscillator 13 that heats up and welds together the ridge-seam area of each folded carton 2. Oscillator 13 is mounted in support 6. At the folding stage illustrated in FIG. 1 there is an empty space a between jaw 11 and jaw 12 or the forward end of oscillator 13.

Lever 5 is essentially Z-shaped and has a lug-like extension 14 with a contact shoulder 15 at the rear. Contact shoulder 15 operates in conjunction with one arm 16 of a pivoting lever 18 that is mounted on support 6 in such a way that it can pivot around a pivot 17 and that has another arm 19 that is connected to a pressure cylinder 22 by a toggle link 21. Between contact shoulder 15 and the arm 16 of pivoting lever 18 is a point 23 of impact for the introduction of force during the pressure-welding process. Both point 23 of impact and a point 24 of contact between the jaw 11 on lever 5 and oscillator 13 are located on an axis 25 of pressure. Axis 25 of pressure is essentially dictated by the pivoting suspension of support 6. The suspension, in the form of a parallel-crank mechanism, consists of shaft 9, a pivoting lever 26, a bearing point 27, and another pivoting lever 28 as well as of bearing sites 29 and 31.

Pressure cylinder 22 has a piston-like or diaphragm-like setting element 32 and communicates through a supply line 33 and a control valve 34 with a pressure line 35 that derives from a source of compressed air. Pressure cylinder 22 is attached to support 6 and operates against a compression spring 36.

A mechanism to prevent excess stroke and breakage in the form of a carrier 37, a bolt 38, and a spring 39 is positioned in the vicinity of shaft 9 and support 6 or pivoting lever 26.

The function of the device for folding and sealing the head of a folded carton in accordance with the invention will now be described.

The motion of lever 5 is initiated positively by shaft 7 and that of support 6 by shaft 9, carrier 37, and bolt 38 through the intermediary of pivoting lever 26 in such a way that gap a is maintained between jaw 11 and oscillator 13 or jaw 12 of support 6.

Once this state has been attained, pressure cylinder 22 is charged with compressed air, pivoting pivoting lever 18 counterclockwise by means of toggle link 21 until its lower arm 16 arrives against the contact shoulder 15 on lug-like extension 14 at point 23 of impact on axis 25 of pressure. Since pivoting lever 18 will accordingly come to rest at this point, the lever 18 will be displaced around its pivot 17 on support 6 toward lever 5 as compressed air continues to be supplied through pressure cylinder 22. The pressure required for welding will accordingly be supplied during contact with the ridge-seam area of folded carton 2 and that area will be welded by welding tool or oscillator 13.

Since carrier 37 is at rest during te motion of support 6 just described, the resulting excess stroke of pivoting lever 26 will be accepted in spring 39.

Upon expiration of the time necessary for welding and cooling off, pressure cylinder 22 is evacuated and support 6 restored along with oscillator 13 to the state that produces gap a by the force of spring 39 so that the tools can be opened by shafts 7 and 9 without damaging the carton.

Since the point 23 of impact of force introduction and point 24 of contact are located between jaw 11 and oscillator 13 on axis 25 of pressure during the pressure-welding process, the ratio of forces illustrated in FIG. 2 will obtain. Forces 41 and 42, which act both toward oscillator 13 and toward pivoting lever 18 on axis 25, will cancel each other out and this is also true as illustrated in FIG. 3 for the force 43 acting on jaw 11 and for the force 44 acting on contact shoulder 15. Consequently, shaft 7, which serves as a pivot and drive for lever 5, will be completely unstressed and need not accept any forces.

This is also true, as will be evident from FIG. 4, of support 6 because the reaction force 45 acting on pressure cylinder 22 and the aforesaid force 41 are both equivalent to the counteracting force 46 that acts on the pivot 17 of support 6. Consequently, pivoting and powering shaft 9, bearing point 27, and the bearing sites 31 and 29 of the other pivoting lever 28 will also be completely unstressed and need not accept any forces.

Figure 5:
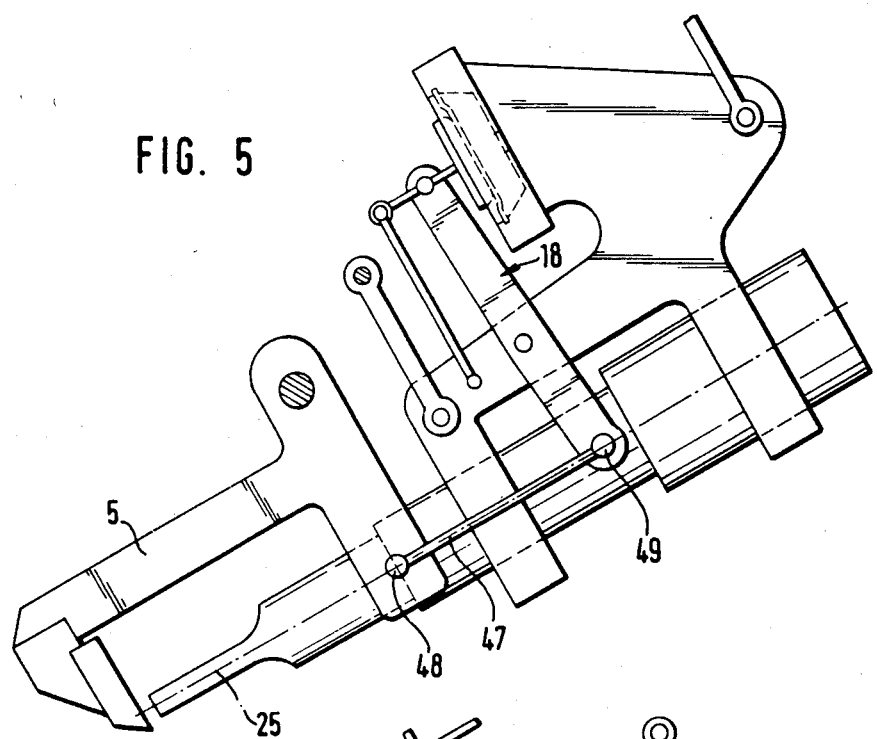
FIG. 5 is a schematic side view of another embodiment of a folding and sealing device.

The embodiment of a folding and sealing device illustrated in FIG. 5 is essentially the same as that illustrated in FIG. 1 with the sole exception that lever 5 and pivoting lever 18 are somewhat different, specifically in that they are connected by a tie rod 47 through points 48 and 49 of articulation. Tie rod 47 is located on axis 25 of pressure during the pressure-welding process and accordingly assumes the function of the lug-like extension 14 and the arm 16 of pivoting lever 18 in the embodiment illustrated in FIG. 1.

Figure 6:
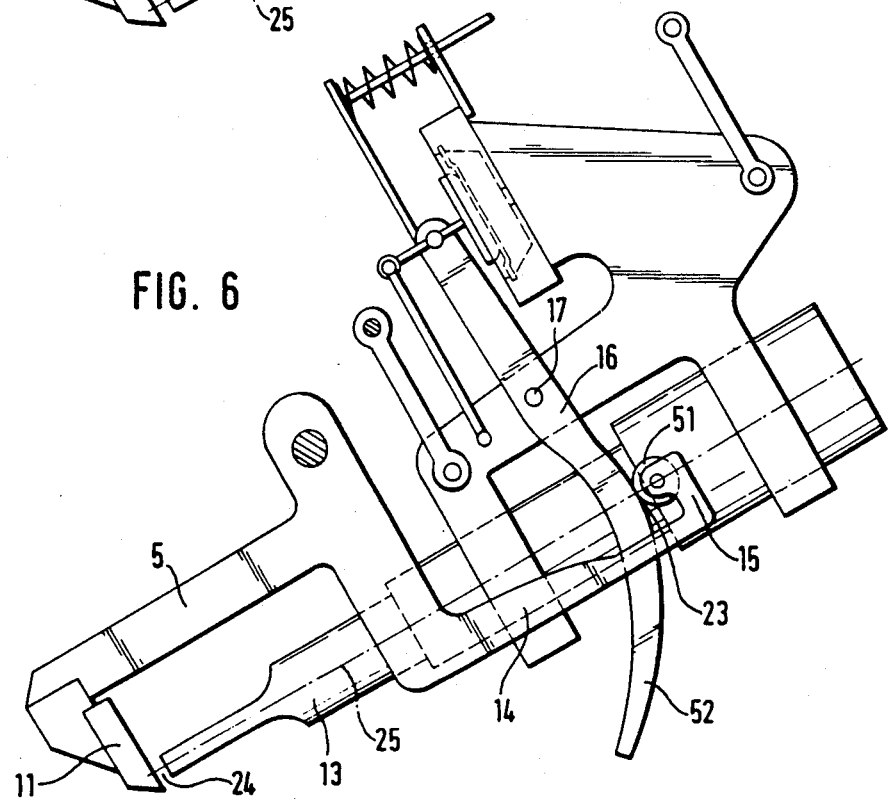
FIG. 6 is a schematic side view of still another embodiment of the device.

In the embodiment illustrated in FIG. 6, lever 5 is again similar in principle to that illustrated in FIG. 1 except that a roller 51 is carried on the end of the contact shoulder 15 on the end of extension 14, the roller 51 operating on a curved segment 52 on the end of arm 16.

Since the point 23 of impact for the introduction of forece and the point 24 of contact between jaw 11 and oscillator 13 are again located on axis 25 of pressure, the operation is the same in principle as described hereinabove.

Figure 7:
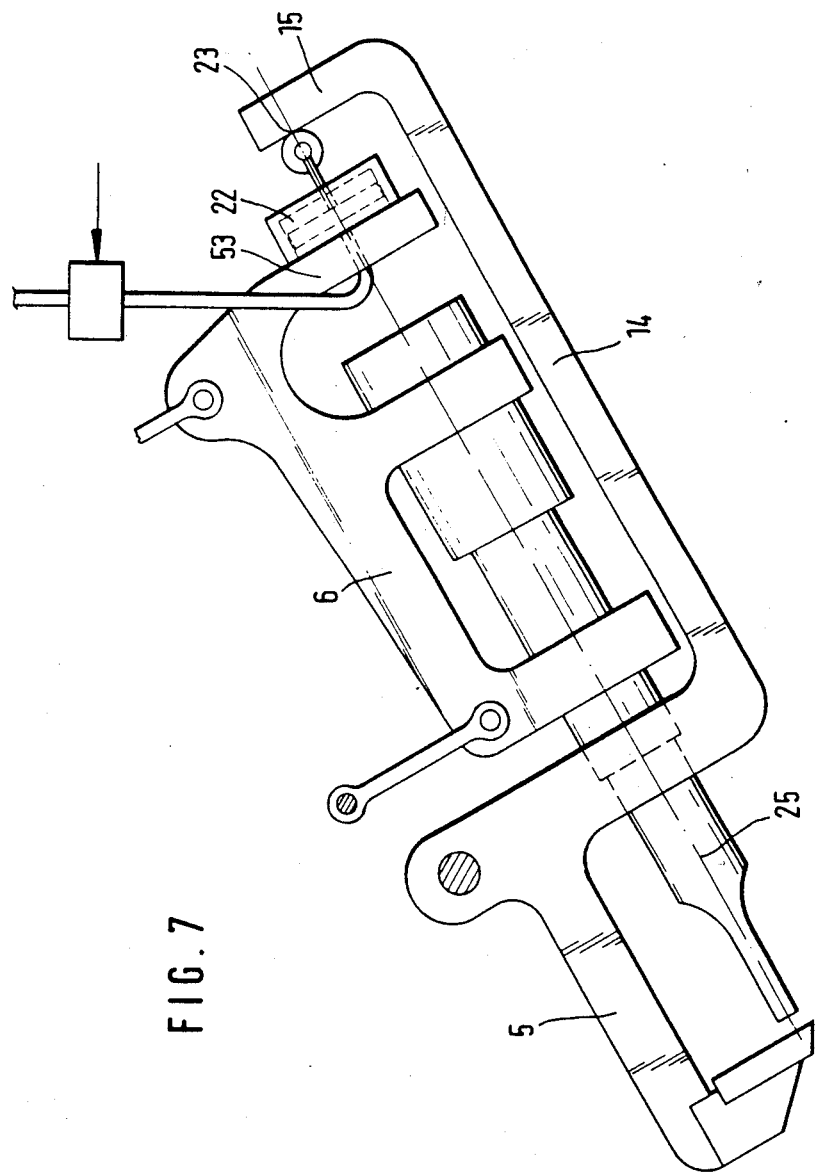
FIG. 7 is a schematic side view of yet another embodiment of the folding and sealing device.

FIG. 7, finally, illustrates an embodiment in which the extension 14 of lever 5 extends with contact shoulder 15 behind an additional leg 53 on support 6 and in which pressure cylinder 22 is positioned immediately between contact shoulder 15 and leg 53 concentric with axis 25 of pressure. Force-introduction impact point 23 is again positioned along axis 25 in such a way as to retain the same advantages with regard to the introduction of force. It should also be noted that aforesaid prevention of excess stroke is also designed to prevent breakage between pivoting lever 26 and carrier 37, with bolt 38 fracturing when the forces become impermissibly high.

When several supports are involved, operating parallel to each other for example, breakage can also be prevented by monitoring the synchronized operation of the support with a sensor.

It is understood that the specification and examples are illustrative but not limitative of the present invention and that other embodiments within the spirit and scope of the invention will suggest themselves to those skilled in the art. Thus, the welding tool can be a hot-air welding tool instead of an ultrasound tool, for example.

We claim:

1. In a device for folding and sealing the head of a folded carton made out of a web or blank of cardboard coated on the inside with a thermoplastic layer in a folding and pressure-welding station, the device including folding and pressure-welding tools comprising a pair of jaws that can be brought together like tongs, the first jaw being mounted on a pivoting lever and the second jaw being mounted along with a welding apparatus that operates in conjunction with the first jaw on a common support that is suspended in such a way that it can pivot, the improvement which comprises independently and respectively connected to the lever and to the support, whereby pivoting of the shafts effects displacement of the lever and the support, a pivoting shaft for the support and a pivoting shaft for the lever and wherein the lever and support are driven independently of each other on the two shafts.

2. A device according to claim 1, wherein the shaft that drives the support, in conjunction with a lever that is suspended on the support in such a way that it can pivot and in conjunction with another lever that extends more or less parallel to the first and is articulated at a stationary point on the device, constitutes a parallel-crank mechanism that allows the support to described an approximately rectilinear straight-line motion toward the first jaw attached to the pivoting lever during the pressure-welding process.

3. A device according to claim 1, wherein the point of contact between the first jaw on the lever and the second jaw on the support, and a point of impact for introducing the force governing the pressure-welding process, both are positioned along a straight axis of pressure of the support.

4. A device according to claim 3, including a pressure cylinder for introducing force during the pressure-welding process.

5. A device according to claim 1, wherein the pressure cylinder is fastened to the support.

6. A device according to claim 5, including a force-transmission mechanism operatively connecting the pressure cylinder and the point of force-introduction impact on the axis of pressure-welding force.

7. A device according to claim 6, wherein the force-transmission mechanism includes a double-armed lever mounted on the support in such a way that it can pivot around a pivot, with one arm connected by a tie rod to a piston-like or diaphragm-like setting element on the pressure cylinder and the other arm operating in conjunction with a component that provides a connection or contact with the lever that carries the first jaw.

8. A device according to claim 7, wherein the contact component is a lug-like extension of the pivoting lever which is essentially Z-shaped.

9. A device according to claim 7, including a roller interposed between the contact component and one arm of the double-armed lever, the arm of the double-armed lever that operates in conjunction with the roller being in the shape of a segment of a curve.

10. A device according to claim 7, wherein the component that connects the lever and the arm of the double-armed lever is a connecting lever that is connected through points of articulation.

11. A device according to claim 5, wherein the pressure cylinder is positioned concentric with the axis of pressure on a leg that faces away from the folding and pressure-welding tools.

12. A device according to claim 1, including a mechanism that prevents excess stroke and breakage, the mechanism including a bolt and a spring that surrounds it and that rests on the one hand on a pivoting lever mounted on one of the shafts and on the other on a carrier that is keyed into the shaft.

* * * * *

UNITED STATES PATENT AND TRADEMARK OFFICE
CERTIFICATE OF CORRECTION

PATENT NO. : 4,581,873
DATED : April 15, 1986
INVENTOR(S) : Hans-Werner Knuppertz, et al.

It is certified that error appears in the above-identified patent and that said Letters Patent is hereby corrected as shown below:

Col. 2, line 30      Delete "supporting" and substitute --support--

Col. 4, line 26      Delete "te" and substitute --the--

Col. 5, line 42      After "comprises" delete "independently and respectively connected to the lever and to the support, whereby pivoting of the shafts effects displacement of the lever and the support,"

Col. 6, line 3      Delete "described" and substitute --describe--

Signed and Sealed this

Twenty-ninth Day of July 1986

[SEAL]

Attest:

*Attesting Officer*

DONALD J. QUIGG

*Commissioner of Patents and Trademarks*